US012709199B2

(12) United States Patent
Line et al.

(10) Patent No.: US 12,709,199 B2
(45) Date of Patent: Aug. 18, 2026

(54) MODULAR SEATING ASSEMBLY FOR A VEHICLE

(71) Applicant: Ford Global Technologies, LLC, Dearborn, MI (US)

(72) Inventors: Johnathan Andrew Line, Northville, MI (US); Lukasz Gajda, Royal Oak, MI (US); Jimmy Moua, Superior Township, MI (US); Linh Ngoc Doan, Belleville, MI (US); Jose Antonio Garcia Rivera, Cuautitlan Izcalli (MX); Craig Rackers, Troy, MI (US); Nelson Edwin Hurst, Westland, MI (US); Chuck R. Reese, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 18/820,965

(22) Filed: Aug. 30, 2024

(65) Prior Publication Data

US 2026/0061895 A1 Mar. 5, 2026

(51) Int. Cl.

| | |
|---|---|
| ***B60N 2/16*** | (2006.01) |
| ***B60N 2/12*** | (2006.01) |
| ***B60N 2/18*** | (2006.01) |

(52) U.S. Cl.

CPC ............ *B60N 2/12* (2013.01); *B60N 2/1695* (2013.01); *B60N 2/1803* (2013.01)

(58) Field of Classification Search

CPC ........................... B60N 2/1803; B60N 2/1695

See application file for complete search history.

(56) References Cited

U.S. PATENT DOCUMENTS

| | | | | |
|---|---|---|---|---|
| 10,029,594 | B2 | 7/2018 | Line et al. | |
| 10,239,431 | B2 | 3/2019 | Line et al. | |
| 10,391,910 | B2 | 8/2019 | Line et al. | |
| 10,744,909 | B2 * | 8/2020 | Kong | B60N 2/1615 |
| 10,759,310 | B2 | 9/2020 | Kong et al. | |
| 11,135,954 | B1 * | 10/2021 | Gajda | B60N 2/686 |

(Continued)

FOREIGN PATENT DOCUMENTS

| | | | | |
|---|---|---|---|---|
| CN | 113147531 A * | 7/2021 | | B60N 2/2213 |
| DE | 102024101947 A1 * | 4/2025 | | B60N 2/68 |
| JP | 4476635 B2 | 6/2010 | | |

(Continued)

*Primary Examiner* — Timothy J Brindley

(74) *Attorney, Agent, or Firm* — Vichit Chea; Price Heneveld LLP

(57) ABSTRACT

A vehicle seating assembly includes a seat base frame including a first and second cross beam. A vehicle seating assembly also includes a seat base operably coupled to the seat base frame, the seat base including a forward portion and a rearward portion, a seatback rotatably coupled to the seat base proximate the rearward end, a seat cushion assembly includes a main cushion and side cushions, and a linkage assembly includes a first link and a second link coupled to the seat base frame and a third link operably coupled to the second link, and a seat pan operably coupled to the linkage assembly and positioned between the seat base frame and the seat cushion assembly. The seat pan including at least one hooked tab disposed on an underside of the seat pan, and a rearward support defining an arcuate portion.

17 Claims, 8 Drawing Sheets

(56) References Cited

U.S. PATENT DOCUMENTS

| | | | | |
|---|---|---|---|---|
| 12,496,947 | B2 * | 12/2025 | Ventre | B60N 2/62 |
| 2015/0274050 | A1 * | 10/2015 | Hosbach | B60N 2/62 |
| | | | | 297/423.26 |

FOREIGN PATENT DOCUMENTS

| | | | | |
|---|---|---|---|---|
| KR | 102284665 | B1 * | 8/2021 | B60N 2/1635 |
| KR | 20240065657 | A * | 5/2024 | B60N 2/22 |
| WO | 2022257512 | A1 | 12/2022 | |

* cited by examiner

MODULAR SEATING ASSEMBLY FOR A VEHICLE

FIELD OF THE DISCLOSURE

The present disclosure generally relates to a vehicle seating assembly and more particularly to a modular seating assembly for a vehicle.

BACKGROUND OF THE DISCLOSURE

Vehicle seating assemblies generally include seating structures configured to support the static and dynamic weight of an occupant during travel. The seating structures are often complex and assembled piece by piece at a manufacturing site.

SUMMARY OF THE DISCLOSURE

According to a first aspect of the present disclosure, a vehicle seating assembly includes a seat base frame including a first cross beam and a second cross beam, wherein the seat base frame is coupled to a vehicle floor. A vehicle seating assembly also includes a seat base operably coupled to the seat base frame, the seat base including a forward portion and a rearward portion, a seatback rotatably coupled to the seat base proximate the rearward end, a seat cushion assembly includes a main cushion and side cushions, and a linkage assembly includes a first link and a second link coupled to the seat base frame and a third link operably coupled to the second link, and a seat pan operably coupled to the linkage assembly and positioned between the seat base frame and the seat cushion assembly. The seat pan includes at least one hooked tab disposed on an underside of the seat pan, and a rearward support defining an arcuate portion.

Embodiments of the first aspect of the present disclosure can include any one or a combination of the following features:

- the seat base is operable between a seated position and a reclined position; and
- the reclined position includes rotating the seatback in a vehicle-rearward direction and raising the seat base from the seated position such that an angle between the seat base and the seatback increases; and
- the first link and the second link rotate about a first rotational axis simultaneously, and wherein the third link rotates about a second rotational axis independent of the first link and the second link when the seat base transitions to the reclined position; and
- the at least one hooked tab of the seat pan includes a first hooked tab spaced apart from a second hooked tab, and wherein the first hooked tab and the second hooked tab assist the linkage assembly in rotating about the first rotational axis and the second rotational axis; and
- the first hooked tab and the second hooked tab of the seat pan are rotatably coupled to the first cross beam, and wherein the first link and the second link allow the first and second hooked tabs of the seat pan to rotate about the first cross beam to adjust the seat base to a first angle; and
- the third link allows the first and second hooked tabs of the seat pan to rotate about the first cross beam to adjust the seat base to a second angle; and
- the reclined position includes increasing a first distance between an underside of the forward portion of the seat base and the vehicle floor when the first link and the second link adjust the seat base to the first angle; and
- the reclined position includes increasing a second distance between an underside of the forward portion of the seat base and the vehicle floor when the third link adjusts the seat base to the second angle; and
- the first link and the second link rotate about the first rotational axis to the first distance and the third link rotates about the second rotational axis to the second distance; and
- the arcuate portion of the rearward support rotates about the second cross beam when the seat base travels the first distance and the second distance; and
- the reclined position includes decreasing a third distance between the seatback and the vehicle floor; and
- the first cross beam includes a first end coupled to a support bracket proximate the first link and a second end coupled to the third link; and
- the second cross beam is operably coupled to a rotation assembly coupled to the seat base frame, wherein the rotation assembly is configured to adjust the rear end of the seat base.

According to a second aspect of the present disclosure, a vehicle seating assembly includes a seat base frame including a first cross beam and a second cross beam, a seat base operable between a seated position and a reclined position, a seat pan operably coupled to the seat base, wherein the seat pan includes a first hooked tab spaced apart from a second hooked tab, and a linkage assembly including a first link having a first end and a second end and a second link having a first end and a second end, wherein the first end of the first link is coupled to the second end of the second link to adjust the seat base from the seated position to the reclined position.

Embodiments of the second aspect of the present disclosure can include any one or a combination of the following features:

- an actuator assembly coupled to the seat base frame, wherein the actuator assembly is configured to adjust the linkage assembly to rotate the seat base about the front cross beam via the first hooked tab and the second hooked tab of the seat pan to adjust the seat base to the reclined position; and
- the seat pan includes a rearward support defining an arcuate portion, and wherein the arcuate portion of the rearward support rotatably engages the second cross beam to rotate about the second cross beam when the seat base transitions to the reclined position.

According to a third aspect of the present disclosure, a vehicle seating assembly includes a seat base frame including a first cross beam positioned in a vehicle-forward location and a second cross beam positioned in a vehicle-rearward location, a seat base operable between a seated position and a reclined position, a seat pan operably coupled to the seat base, wherein the seat pan includes a hooked tab and a rearward support defining an arcuate portion that forms an engagement channel, and a linkage assembly including a first link and a second link, wherein the first link adjusts the seat base a first distance and the second link adjusts the seat base a second distance.

Embodiments of the second aspect of the present disclosure can include any one or a combination of the following features:

- the hooked tabs of the seat pan rotatably engage with the first cross beam and the engagement channel of the seat pan is rotatably engaged with the second cross beam; and the first distance positions the seat base at a first angle and the second distance positions the seat base at a second angle, and wherein the second angle is larger than the first angle.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figures 1, 2:
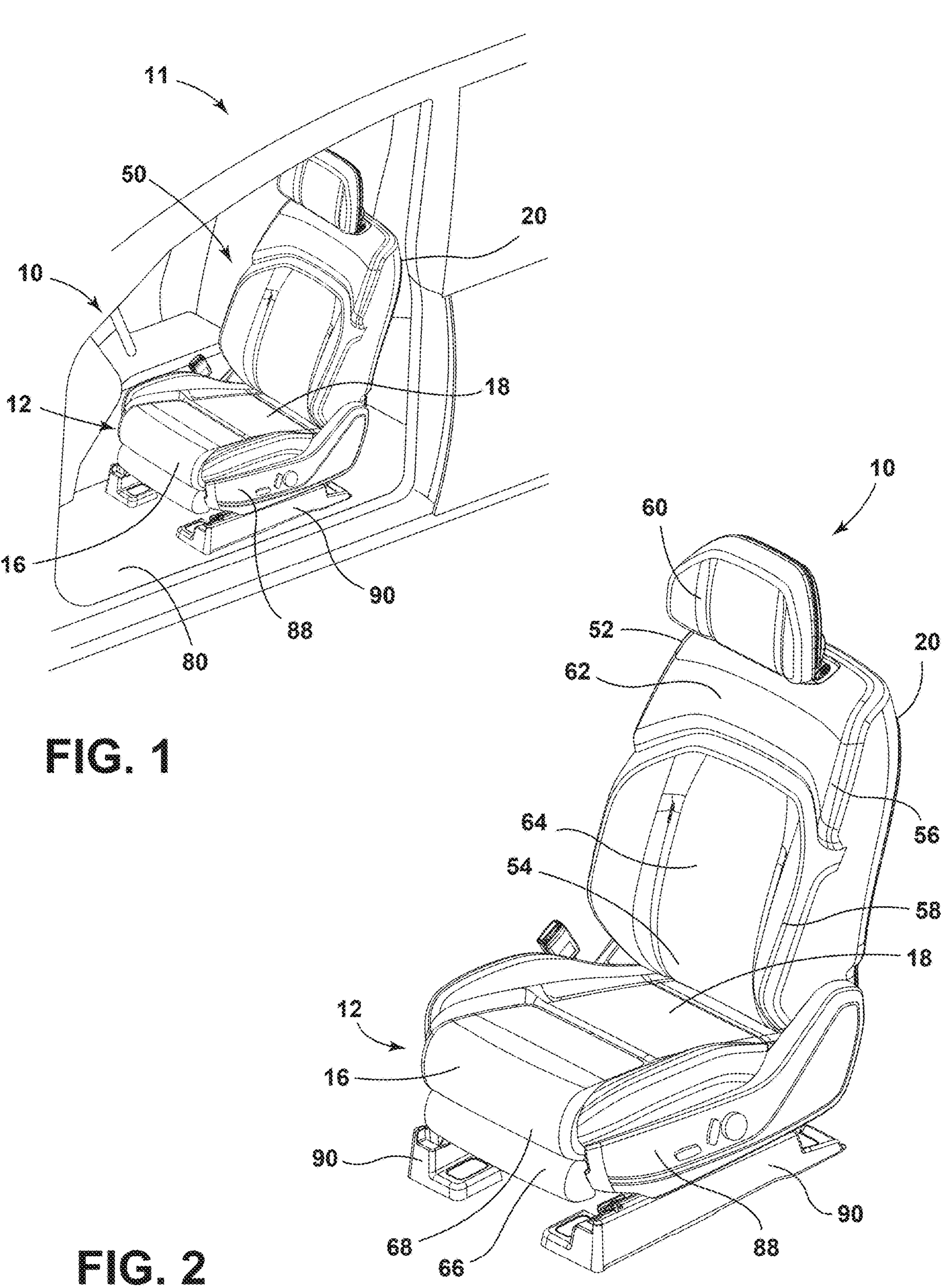
FIG. 1 is a partial side perspective view of a vehicle seating assembly within an interior compartment of a vehicle.
FIG. 2 is a side perspective view of a vehicle seating assembly including a seat base pivotably coupled with a seatback.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a modular seating assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-10, a reference numeral 10 generally designates a seating assembly for a vehicle 11 that includes a seat base 12 operably coupled to a seat base frame 14. The seat base 12 includes a forward portion 16 and a rearward portion 18. A seatback 20 is rotatably coupled to the seat base 12 proximate the rearward end. A seat cushion assembly 22 is coupled to a seat pan 24. The seat pan 24 includes at least one hooked tab 26 disposed on an underside 28 of the seat pan 24. The seat pan 24 also includes a rearward support 30 defining an arcuate portion 32. A linkage assembly 34 is operably coupled to the seat pan 24 and includes a first link 36, which may generally include opposing first links 36*a*, 36*b* coupled to the seat base frame 14 and a second link 38 operably coupled to at least one of the first links 36*a*, 36*b*.

Referring now to FIG. 1, the vehicle 11 includes an interior compartment 50, which includes at least one seating assembly for supporting passengers thereon. The vehicle 11 may be a sedan, a sport utility vehicle, a van, a truck, a crossover, other styles of wheeled motor vehicles, or other styles of vehicles. The vehicle 11 may be a manually operated vehicle (e.g., operated with a human driver), a fully autonomous vehicle (e.g., operated without a human driver), or a partially autonomous vehicle (e.g., operated with or without a human driver). Additionally, the vehicle 11 may be utilized for personal and/or commercial purposes, such as for ride-providing services (e.g., chauffeuring), transporting, and/or ride-sharing services.

Referring still to FIG. 1, as well as FIG. 2, the vehicle seating assembly 10 includes the seat base 12 having the forward portion 16 and the rearward portion 18, and the seatback 20 having a top portion 52 and a bottom portion 54. The rearward portion 18 of the seat base 12 is positioned proximate the bottom portion 54 of the seatback 20, such that the seatback 20 is pivotal relative to the rearward portion 18 of the seat base 12. The seatback 20 includes both an upper seatback 56 and a lower seatback 58. The vehicle seating assembly 10 includes a head restraint 60 that is disposed on the upper seatback 56. The head restraint 60 is moveable between forward and rearward positions to accommodate various sized heads of passengers, as well as different heights of passengers. The vehicle seating assembly 10 also includes controls specifically configured to adjust an upper thoracic portion 62 of the upper seatback 56 or a lower lumbar portion 64 of the lower seatback 58.

The vehicle seating assembly 10 may include a variety of comfort controls, including, for example, calf support 66, thigh support 68, and a pivot control that allows for pivoting movement of the seatback 20. Additionally, a receiver 74 for a tether assembly is disposed on the vehicle seating assembly 10 to secure the passenger when seated. In addition, the vehicle seating assembly 10 is suspended on a rail slide assembly 76 (FIG. 6A) that allows movement of the vehicle seating assembly 10 in fore and aft directions relative to the vehicle. The rail slide assembly 76 includes rails 78 that are secured on a vehicle floor 80. The rail slide assembly 76 also includes slides 82 which may be operably coupled with the vehicle seating assembly 10, in particular the seat base frame 14. The slides 82 are in sliding engagement with the rails 78. Accordingly, a forward trim component and side trim pieces 88 may be disposed about the seat base 12 and base trim pieces 90 may be disposed about the seat base frame 14. The trim components cover the seat base frame 14 and structural components of the seat base 12, such as the rail slide assembly 76.

Figure 3:
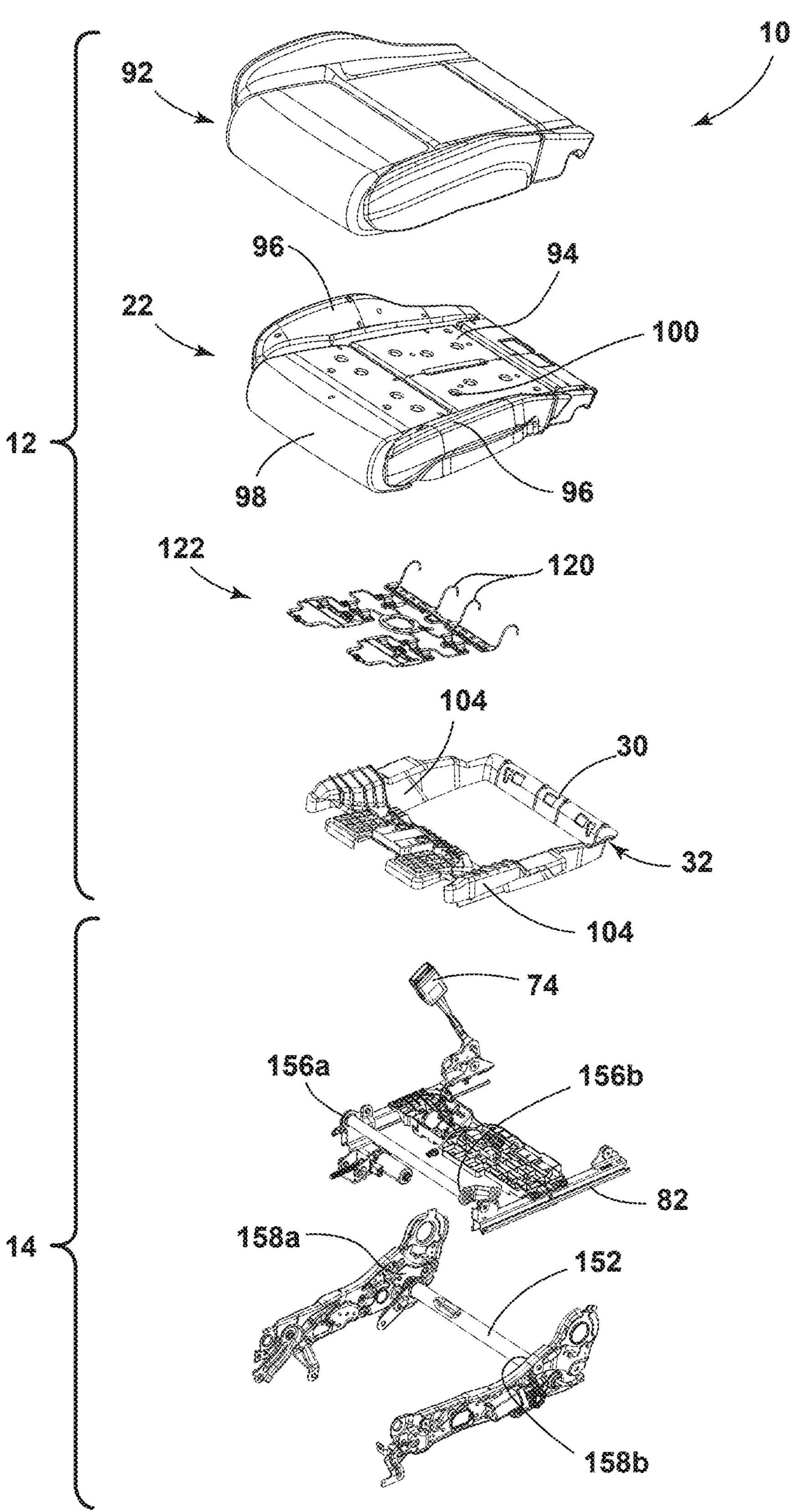
FIG. 3 is an exploded view of a seat base and a seat base frame for a vehicle seating assembly including a cover stock, seat cushion assembly, suspension assembly, and a seat pan.

Referring to FIG. 3, the seat base 12 includes the seat cushion assembly 22 with a cover stock 92 disposed thereon. The cover stock 92 may include different varieties over different portions of the seat cushion assembly 22. The seat cushion assembly 22 of the seat base 12 includes a main cushion 94, seat side bolsters 96, and a thigh support cushion 98. The thigh support cushion 98 is configured to wrap over thigh support 68 to provide comfort while supporting the passenger's thighs. The main cushion 94 and/or side bolsters 96 may include a plurality of ventilation holes 100 configured to allow air to pass through the seat base 12. Accordingly, a climate control system may be provided in the seat base 12, which can draw air from, or blow air through, the seat cushion assembly 22 and cover stock 92.

Figure 4:
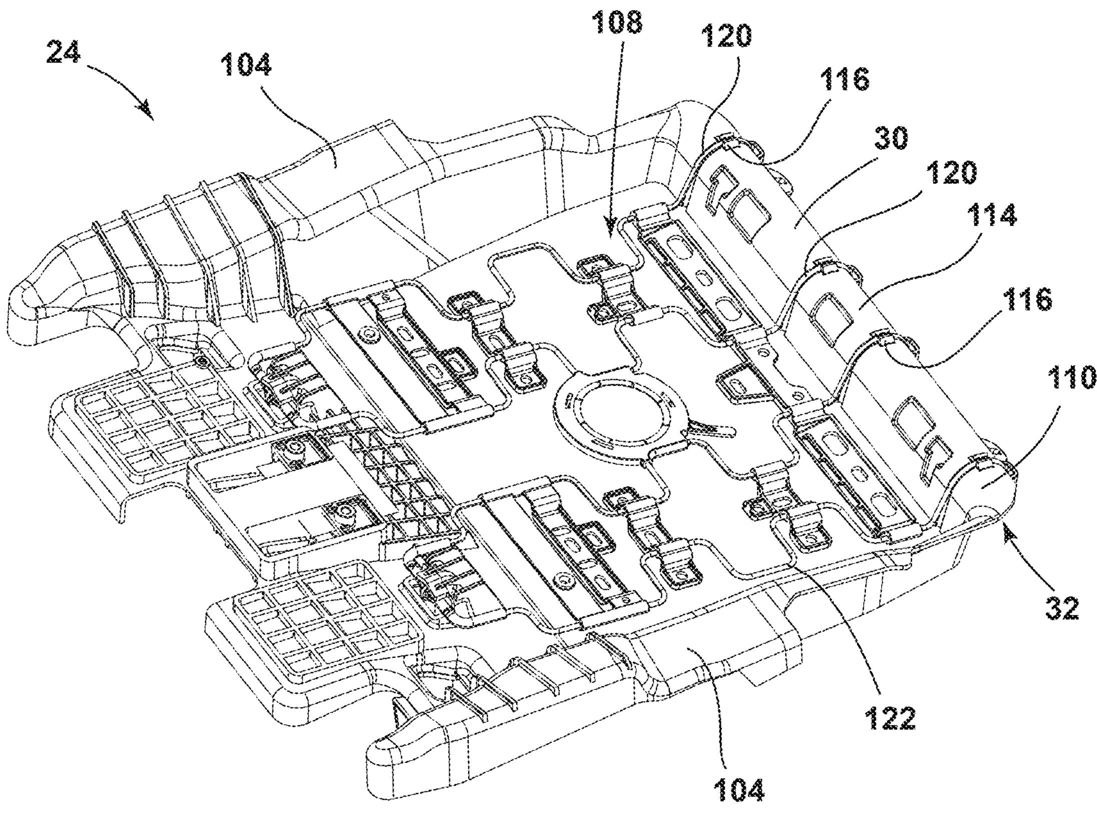
FIG. 4 is a side perspective view of a seat pan including a suspension assembly disposed in an intermediate open area of the seat pan.
Figure 5:
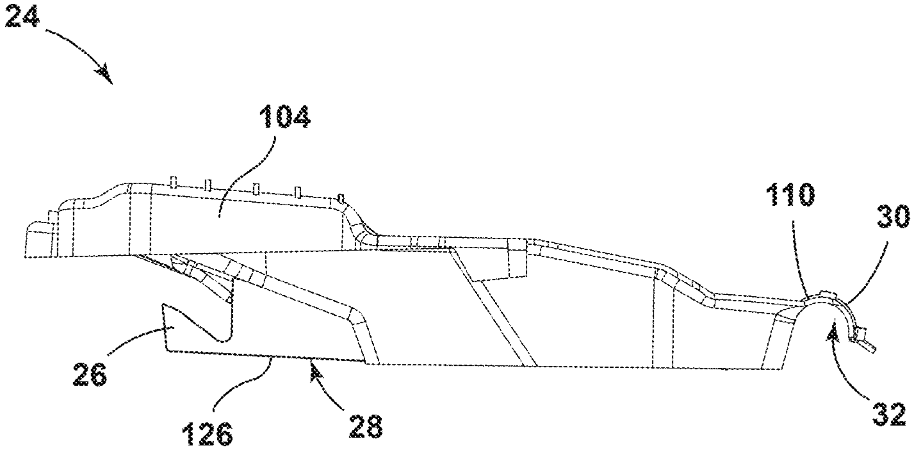
FIG. 5 is a side elevational view of a seat pan including a rearward support defining an arcuate portion.

Referring still to FIG. 3, as well as FIGS. 4 and 5, the seat base 12 includes the seat pan 24 that is operably coupled with the seat base frame 14 and is positioned between the seat base frame 14 and the seat cushion assembly 22 with the cover stock 92 disposed thereon. The seat pan 24 may include side bolsters 104 that may be integrally formed with the seat pan 24 or may be attached thereto. The side bolsters 104 are configured to support and flex under stress to provide resiliency to the seat pan 24. Additionally, integrally forming the side bolsters 104 with the seat pan 24 increases the structural support for the passenger during ingress and/or egress from the seating assembly, as well as during jounce and abuse loading circumstances.

Referring still to FIGS. 3-5, the seat pan 24 further includes the rearward support 30 that, along with the side bolsters 104, at least partially defines an intermediate open area 108. The rearward support 30 of the seat pan 24 defines the arcuate portion 32 forming a rear engagement channel 110. The rearward support 30 may be configured to operably couple the seat pan 24, and consequently, the seat base 12, with the seat base frame 14, as is further described herein. A surface 114 of the rearward support 30 includes receiving notches 116 configured to receive hooks 120 of a suspension assembly 122. The suspension assembly 122 is disposed in the intermediate open area 108 of the seat pan 24. The suspension assembly 122 supports the seat cushion assembly 22 and the seat cover stock 92 and is configured to withstand both the static and dynamic loads associated with seated passenger travel. Additionally, the seat pan 24 includes a bottom wall 126 having the at least one hooked tab 26 extending therefrom in a vehicle-forward direction. In the illustrated configuration depicted in FIG. 8, there is a first hooked tab 26*a* and a second hooked tab 26*b* that are each forwardly extending hooked tabs 26. However, it will be understood that more or less forwardly-extending hook features may be contemplated. Accordingly, the hooked tabs

26 engage the seat base frame 14 to assist in coupling the seat base 12 to the seat base frame 14, as is further described herein.

Figures 6A, 6B:
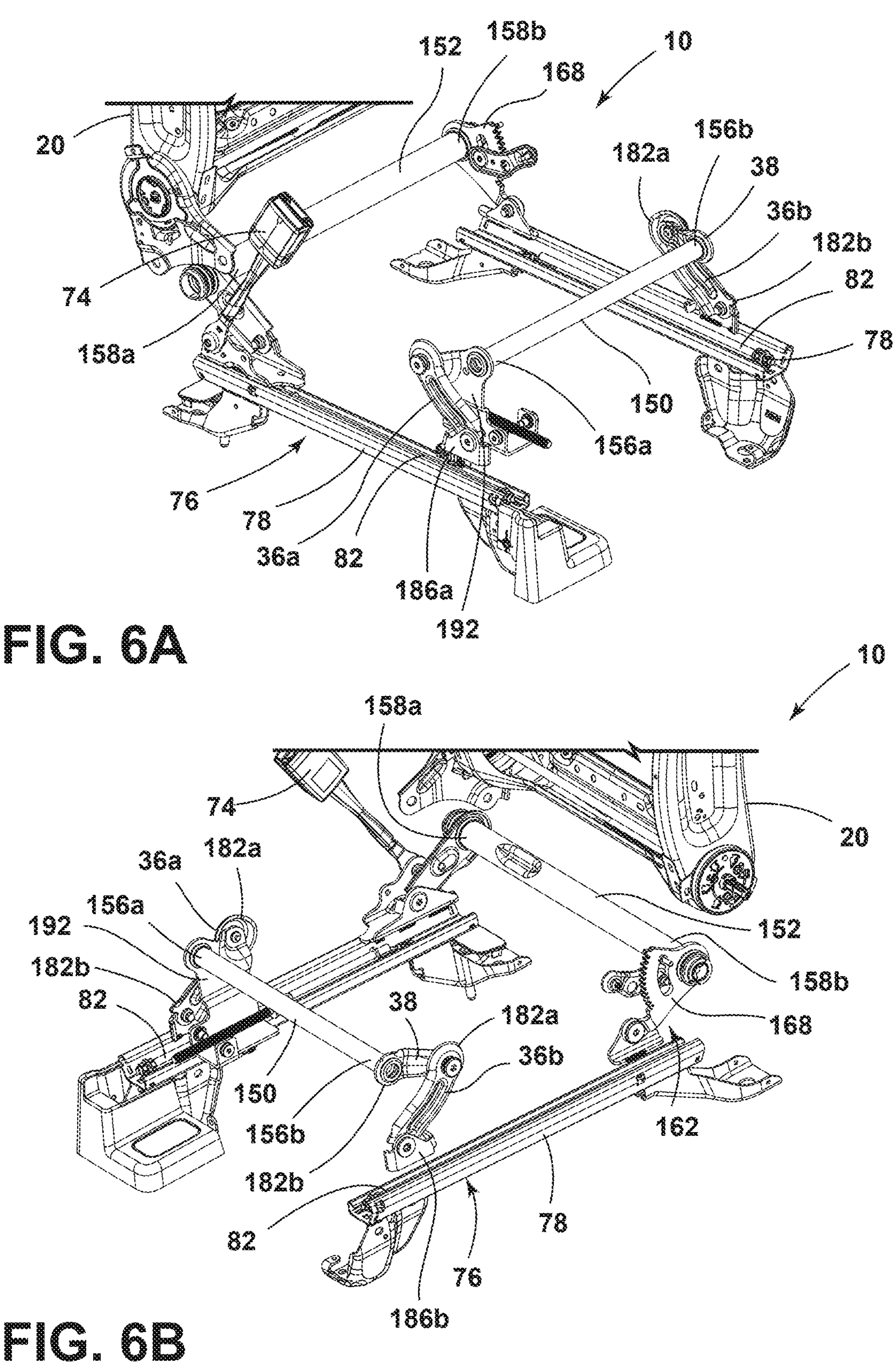
FIG. 6A is a partial left side perspective view of a seat base frame including a front cross beam operably coupled to a linkage assembly and a rear cross beam.
FIG. 6B is a partial right side perspective view of a seat base frame including a front cross beam operably coupled to a linkage assembly and a rear cross beam.

Referring to FIGS. 6A and 6B, the seat base frame 14, the rail slide assembly 76, and the linkage assembly 34 are shown in a left side perspective view (FIG. 6A) and a right side perspective view (FIG. 6B). The vehicle seating assembly 10 includes the seat base frame 14 that operably couples the seat base 12 to the vehicle floor 80. The seat base frame 14 includes a front cross beam 150 proximate to the thigh support 68 and a rear cross beam 152 proximate to the bottom portion 54 of the seatback 20 when the vehicle seating assembly 10 is assembled. The front cross beam 150 includes a first end 156*a* and a second end 156*b* that engage the linkage assembly 34 to assist in vertically displacing the seat base 12. In other words, the engagement of the front cross beam 150 with the linkage assembly 34 assists in directing the forward portion 16 of the seat base 12 in an upward and a downward direction. The rear cross beam 152 of the seat base frame 14 includes a first end 158*a* and a second end 158*b* and may be configured to engage with a rotation assembly 162 to adjust the rearward portion 18 of the seat base 12 in the generally upward or downward direction independent of the movement of the forward portion 16 of the seat base 12.

Referring still to FIGS. 6A and 6B, the vehicle seating assembly 10 is operable between a seated position (see FIG. 9A) and a reclined position (see FIG. 9C) with the assistance of the linkage assembly 34. The linkage assembly 34 includes the opposing first links 36*a*, 36*b* having a first end 182*a* and a second end 182*b*, and the second link 38 having a first end 184*a* and a second end 184*b*. The first links 36*a*, 36*b* are each positioned on opposing sides of the seat base frame 14. In various examples, the second end 182*b* of the first links 36*a*, 36*b* are coupled to the slides 82 of the rail slide assembly 76 via coupling brackets 186*a*, 186*b*, respectively, to form a rotational axis 188. In addition, the first end 182*a* of the first link 36*a*, may be operably coupled to a support bracket 192 of the seat base frame 14. As such, the first end 156*a* of the front cross beam 150 may be operably coupled to the support bracket 192 proximate the first link 36*a*.

The first end 182*a* of the first link 36*b* is coupled to the second end 184*b* of the second link 38 forming a rotational axis 194. Accordingly, the second end 156*b* of the front cross beam 150 may be operably coupled to the first end 184*a* of the second link 38. As such, when the seat base 12 is coupled to the seat base frame 14 and the vehicle seating assembly 10 is transitioning from the seated position to the reclined position, the opposing first links 36*a*, 36*b* simultaneously rotate in a vehicle-forward direction about rotational axis 188 to lift the seat base 12 a first distance. Simultaneously, or when the first links 36*a*, 36*b* reach the first distance, the second link 38 may rotate about rotational axis 194 in a vehicle-rearward direction to assist in lifting the seat base 12 a second distance.

The first end 158*a* of the rear cross beam 152 may be operably coupled to a bracket of the rotation assembly 162 and the second end 158*b* of the rear cross beam 152 may be operably coupled to a toothed portion 198 of the rotation assembly 162. The rotation assembly 162 may be described as a rack-and-pinion assembly. The rotation assembly 162 may include the toothed portion 198 (rack) of a second bracket coupled to the seat base frame 14 and a toothed wheel (pinion) coupled to an actuator. The toothed portion 198 of the second bracket and the toothed wheel may form a toothed interface. Actuation of the actuator may cause the toothed wheel to rotate so that the toothed portion 198 of the second bracket may move from a rest position to a deployed position. Accordingly, as the rotation assembly 162 adjusts from the rest position to the deployed position, the rear portion of the seat base 12 may adjust in a generally upward or downward direction independent of the forward portion 16. However, it is contemplated that the rear cross beam 152 may remain fixed or may not include the rotation assembly 162. Accordingly, the front cross beam 150 is positioned in a vehicle-forward location and the rear cross beam 152 is positioned in a vehicle-rearward location.

Figure 7:
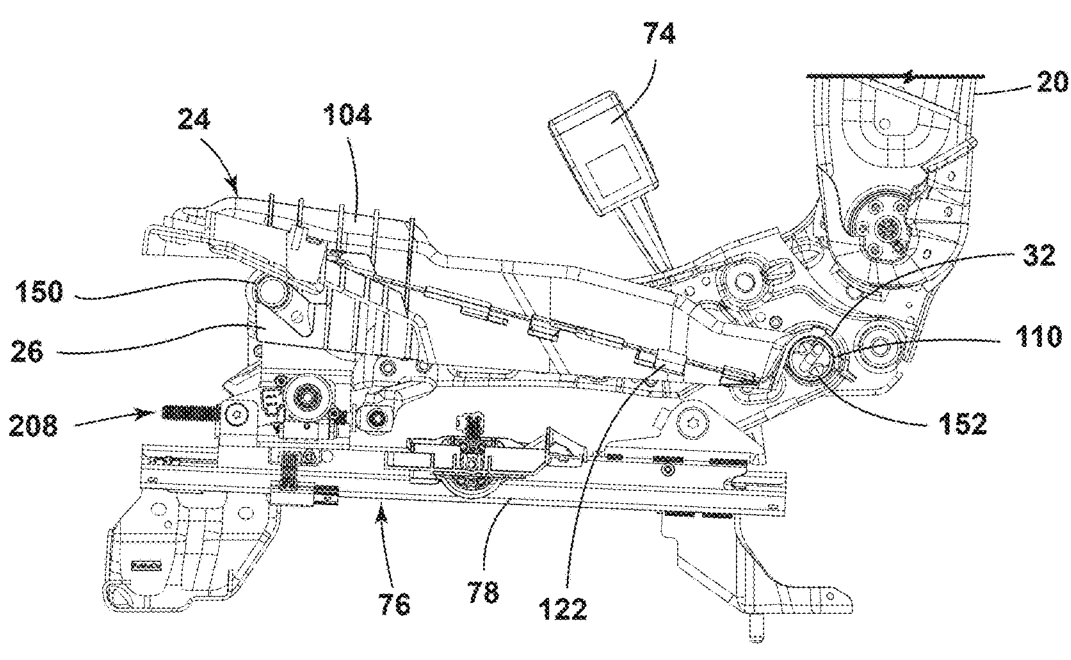
FIG. 7 is a partial cross-sectional side elevational view of a seat pan operably coupled to a front cross beam and a rear cross beam of a seat base frame.
Figure 8:
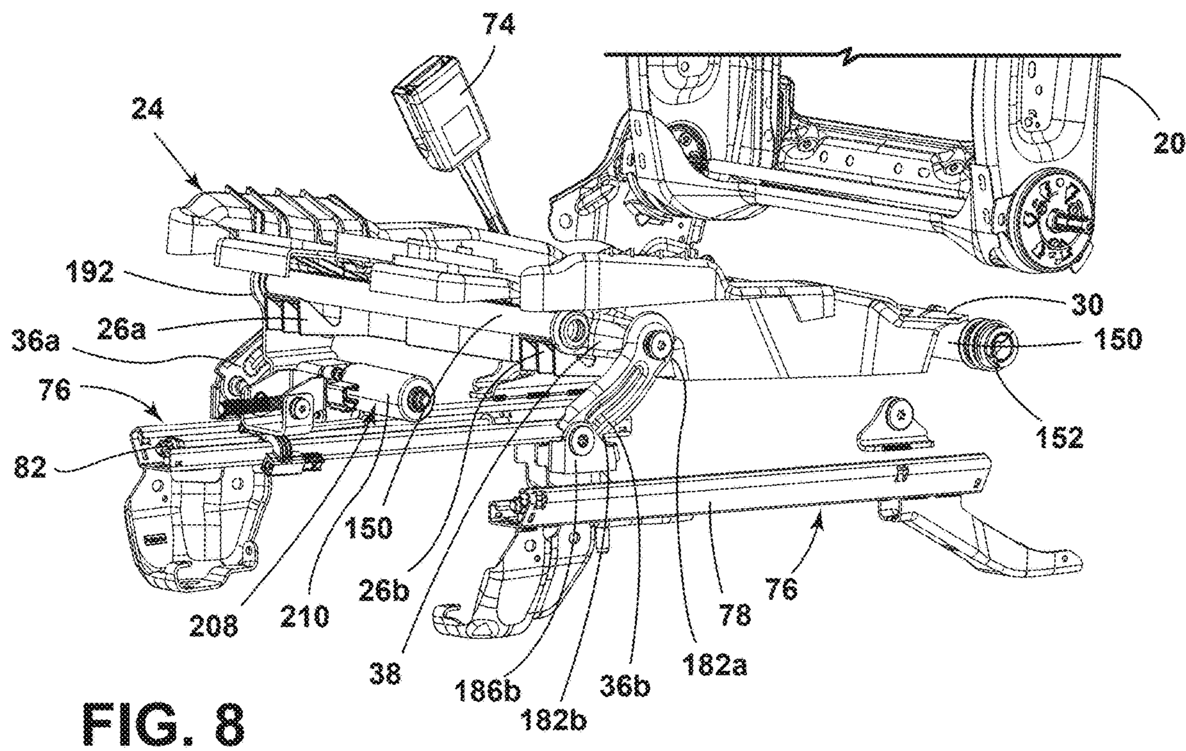
FIG. 8 is a partial side perspective view of a linkage assembly operably coupled with a seat pan of a seat base.

Referring now to FIGS. 7 and 8, during manufacturing, the seat base 12 is prepared for engagement with the seat base frame 14. In particular, the first and second hooked tabs 26*a*, 26*b* of the seat pan 24 are configured to engage the front cross beam 150 to allow for rotation of the front portion 16 of the seat base 12 about the front cross beam 150 in a generally downward direction towards the vehicle floor 80. As the seat pan 24 continues to rotate about the front cross beam 150 via the first and second hooked tabs 26*a*, 26*b*, the arcuate portion 32 of the rearward support 30 engages with the rear cross beam 152 of the seat base frame 14. In particular, as the seat base 12 is rotated downward into position, the rear engagement channel 110 of the rearward support 30 engages the rear cross beam 152. Once engaged, the linkage assembly 34 of the seat base frame 14 may adjust the forward portion 16 of the seat base 12 and the rotation assembly 162 of the seat base frame 14 may adjust the forward portion 16 and the rearward portion 18 of the seat base 12, respectively, to, from, or between the seated position and the reclined position.

Figure 9A:
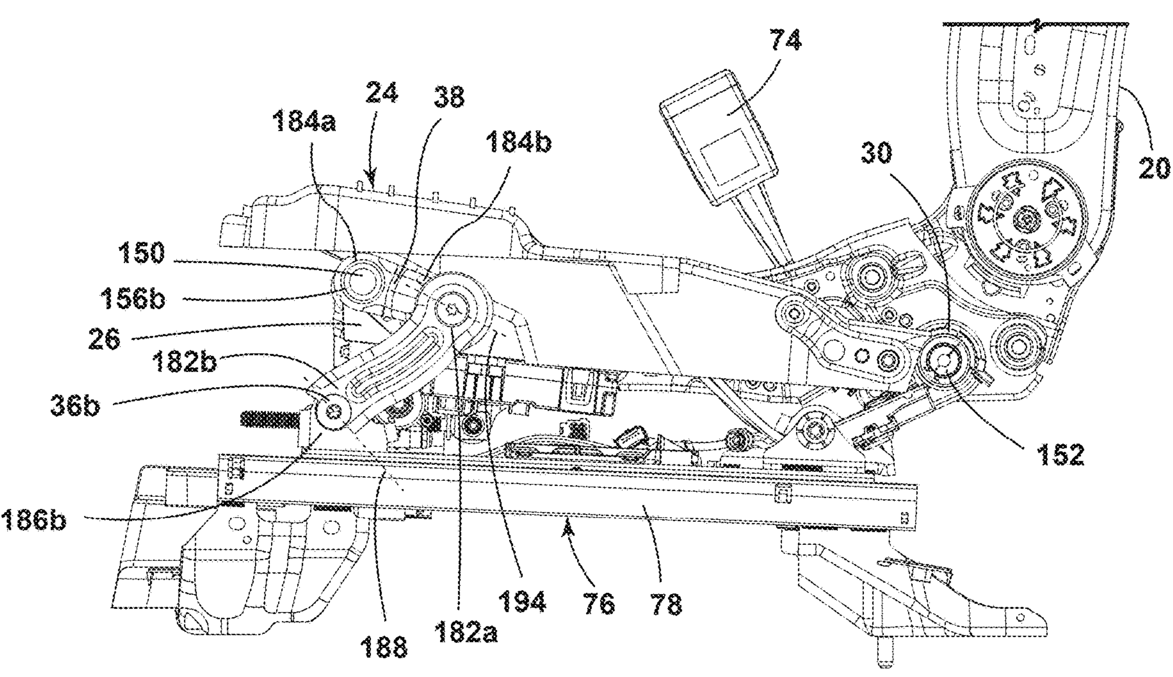
FIG. 9A is a partial side elevational view of a seat pan of a seat base in a seat position.
Figure 9B:
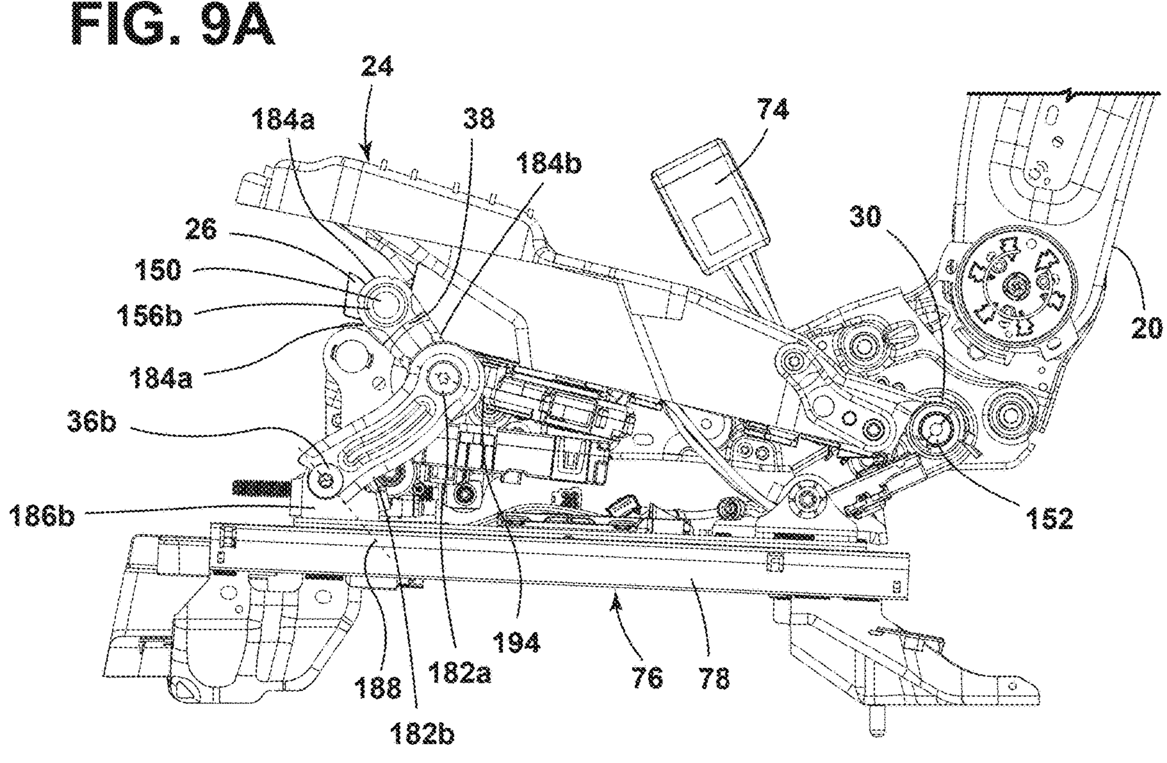
FIG. 9B is a partial side elevational view of a linkage assembly rotatable about a rotational axis to lift a seat base a first distance.
Figure 9C:
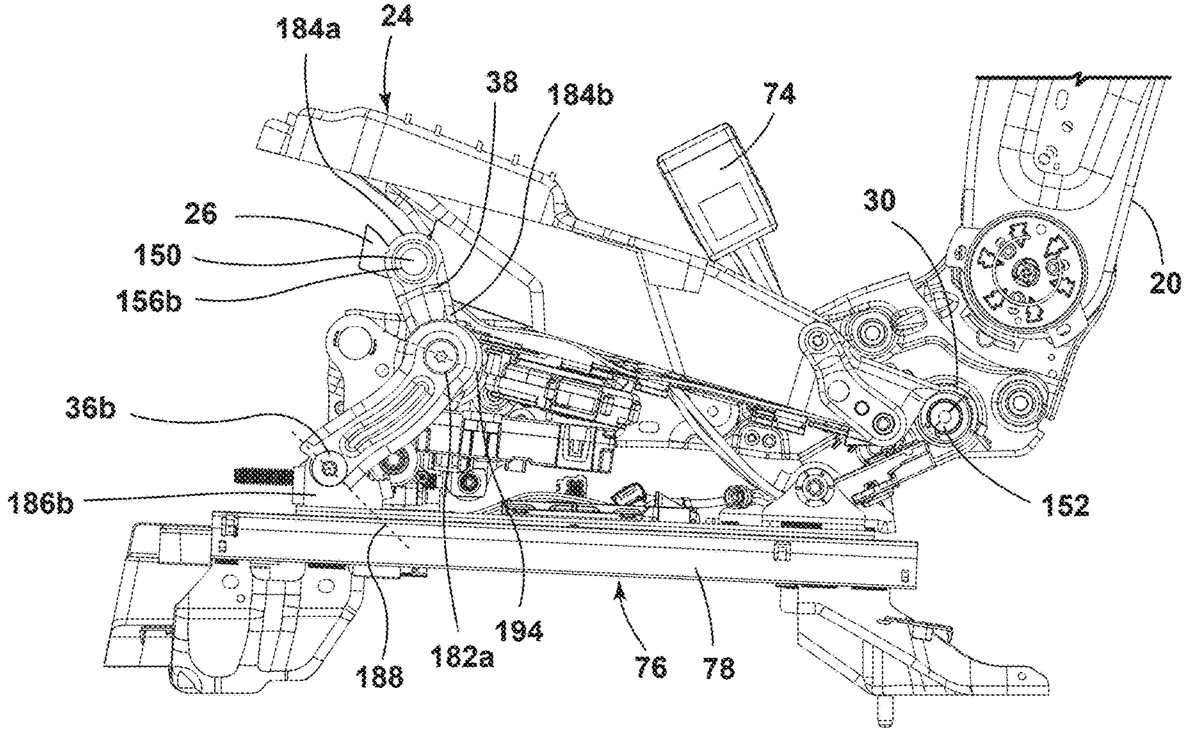
FIG. 9C is a partial side elevational view of a linkage assembly rotatable about a rotational axis to lift a seat base a second distance to a reclined position.

Referring now to FIGS. 9A-9C, the vehicle seating assembly 10 is capable of moving from the seated position toward the reclined position. The reclined position of the vehicle seating assembly 10 is intended for use when the vehicle 11 is in a stationary (i.e., non-moving) state. The vehicle seating assembly 10 may be prevented from transitioning to the reclined position if the vehicle is not in a stationary state. For example, the vehicle is in a stationary state while a transmission of the vehicle 11 is in a parked position. In the reclined position, an angular relationship between the seat base 12 and the vehicle floor 80 can be adjusted. The first distance and the second distance between the forward portion 16 of the seat base 12 and the vehicle floor 80 may increase when the vehicle seating assembly 10 is transitioned from the seated position to the reclined position. Accordingly, a third distance between the rearward portion 18 of the seat base 12 and the vehicle floor 80 may decrease when the vehicle seating assembly 10 is transitioned from the seated position to the reclined position. In various examples, each component that is positioned between the seat base 12 and the vehicle floor 80 may be adjusted in its angular relationship relative to the vehicle floor 80 when the vehicle seating assembly 10 is transitioned to the reclined position.

When the vehicle seating assembly 10 transitions from the seated position toward the reclined position the first distance between the underside 28 of the forward portion 16 of the seat base 12 and the vehicle floor 80 may increase. In various examples, transitioning the vehicle seating assembly 10 from the seated position toward the reclined position also increases the second distance between the underside 28 of the forward portion 16 of the seat base 12 and the vehicle floor 80. Said another way, the first distance may position the seat base 12, at between about 15° to about 18° and the second distance may position the seat base 12, at between about 19° to about 22°. Accordingly, when the seating assembly is in the seated position, the distance between the seat base 12 and the rails 78 may be generally zero.

Additionally, transitioning the vehicle seating assembly 10 from the seated position toward the reclined position can include rotating the seatback 20 in the vehicle-rearward direction from the seated position such that an angle of between about 30° and about 54° may be realized between the seatback 20 and the vehicle floor 80. As such, transitioning the vehicle seating assembly 10 from the seated position toward the reclined position can include decreasing the third distance between the rearward portion 18 of the seat base 12 and the vehicle floor 80.

Referring still to FIGS. 9A-9C, the vehicle seating assembly 10 is provided with an actuator assembly 208 that is responsible, at least in part, for transitioning the vehicle seating assembly 10 between the seated position, as illustrated in FIG. 9A, and the reclined position, as illustrated in FIG. 9B. The actuator assembly 208 may be positioned proximate the underside 28 of the seat pan 24 and is configured to operate the linkage assembly 34. When a motor 210 of the actuator assembly 208 is activated, the first links 36*a*, 36*b* may be configured to rotate about rotational axis 188 in the vehicle-forward direction to the first distance. Accordingly, the seat base 12 is positioned at a first angle relative to the vehicle floor 80. For example, the first angle of the seat base 12 at the first distance may be between about 15° to about 18°. Upon reaching the first distance, the motor 210 may allow for the second link 38 to rotate about rotational axis 194 to the second distance. Accordingly, the seat base 12 is positioned at a second angle relative to the vehicle floor 80 to realize the reclined position of the vehicle seating assembly 10. For example, the second angle of the seat base 12 at the second distance may be between about 19° to about 22°. When the seat base 12 is in the reclined position at the second angle, the second angle creates a normal force relative to the rotational axis 194 on the seat pan 24 through the range of travel from the first distance to the second distance. As such, the seat base 12 is lifted at a 2.5:1 to 3:1 ratio along the rotational axis 194. In other words, when the seat base 12 is positioned at the first distance, the seat base 12 may be partially in the reclined position at the first angle. When the seat base 12 is positioned at the second distance, the seat base 12 may be at a maximum reclined position at the second angle. Consequently, as the seat base 12 is adjusted from and/or between the first distance and the second distance, the seatback 20 may rotate in the vehicle-rearward direction.

When the vehicle seating assembly 10 is in the reclined position, a neutral positioning capability may be achieved. The neutral position of the vehicle seating assembly 10 may simulate a posture that minimizes gravitational stress on the body, thereby further reducing strain on the spine and promoting optimal weight distribution. To achieve this, the actuator assembly 208 and the linkage assembly 34 may be adjusted with additional articulation points and degrees of freedom, allowing for adjustment of the seat base 12 and the seatback 20 angles.

Figure 10:
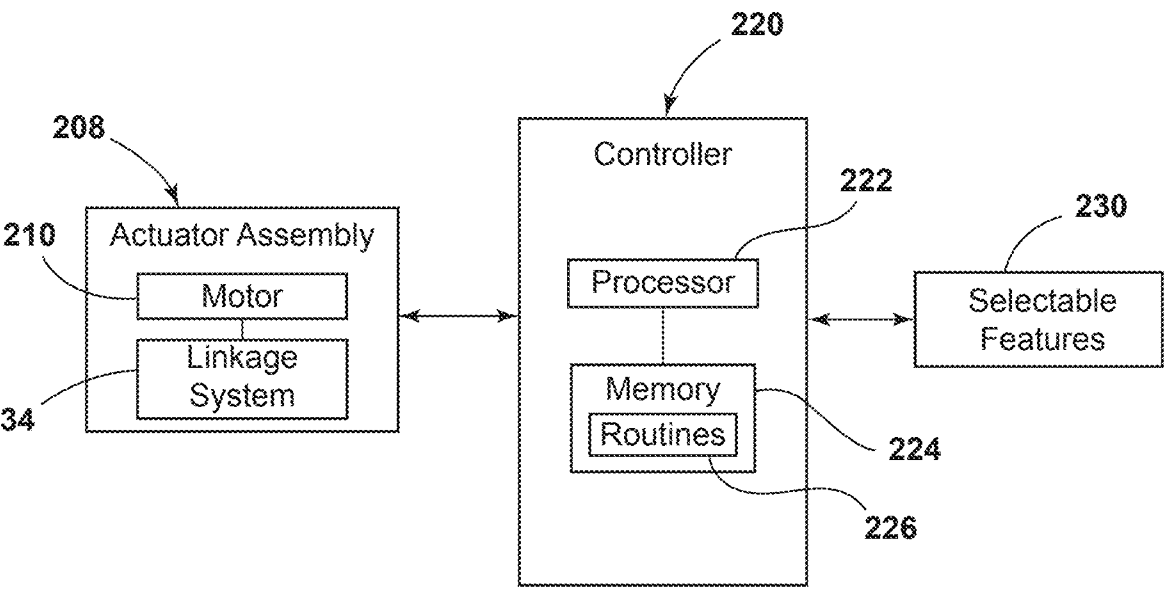
FIG. 10 is a block diagram of a control arrangement for a vehicle seating assembly for a vehicle.

Referring to FIG. 10, the vehicle seating assembly 10 may include a controller 220 that has a processor 222, such as a microprocessor, memory 224, and other digital and/or analog control circuitry. Instructions or routines 226 are stored in the memory 224 and executable by the processor 222. The controller 220 is in communication with a user interface, which may include a display, such as a touch screen with use inputs and output, or other selectable feature 230 (e.g., buttons, switches, knobs, etc.). The passenger or user may input a selection into the user interface regarding the vehicle seating assembly 10 positioning between the seated position and the reclined position. The input is communicated to the controller 220, which may then activate the motor 210.

The controller 220 may include the routine 226 for managing the transition between the seated position and the reclined position of the vehicle seating assembly 10. When the passenger interacts with the selectable features 230, the controller 220 may activate the actuator assembly 208 positioned proximate the underside 28 of the seat pan 24. The controller 220 may then coordinate the movement of the linkage assembly 34 by the motor 210, including the rotation of the first links 36*a*, 36*b* about rotational axis 188 to lift the seat base 12 to the first distance at the first angle. Subsequently, the controller 220 may direct the rotation of the second link 38 about rotational axis 194 to achieve the second distance further inclining the seat base 12 at the second angle. Simultaneously, the controller 220 may adjust the seatback 20 angle, rotating the seatback 20 in a vehicle-rearward direction.

Use of the present device and system may provide for a variety of advantages. For example, vehicle seating assemblies are typically designed to meet a number of specifications that are dictated by their use within a passenger compartment of the vehicle 11. These specifications include, but are not limited to, spatial considerations within the passenger compartment, packaging of user-desired feature (s), and balancing user experience for a plurality of users within the passenger compartment (e.g., leg room). The vehicle seating assembly 10 of the present disclosure is operable in the reclined position of the vehicle seating assembly 10 which may decrease a number of pressure points and/or an intensity of pressure points for a user seated in the vehicle seating assembly 10 while providing a more ergonomically comfortable arrangement than a conventional reclined position where the seatback 20 may be moved relative to the seat and the vehicle floor 80 in an isolated manner. The reclined position of the vehicle seating assembly 10 of the present disclosure may place the seatback 20 in a reclined position relative to the vehicle floor 80 and/or the seat. Additionally, the reclined position of the vehicle seating assembly 10 of the present disclosure can place the forward portion 16 of the seat base 12 in a reclined position relative to the vehicle floor 80 when compared to the seated position.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:

a seat base frame including a first cross beam and a second cross beam, wherein the seat base frame is configured to be coupled to a vehicle floor;

a seat base operably coupled to the seat base frame, the seat base including a forward portion and a rearward portion, wherein the seat base is operable between a seated position and a reclined position;

a seatback rotatably coupled to the seat base proximate the rearward portion;

a seat cushion assembly including a main cushion and side cushions; and a linkage assembly including a pair of first links coupled to the seat base frame and a second link operably coupled to one of the pair of first links, wherein the pair of first links rotate about a first rotational axis simultaneously, and wherein the second link rotates about a second rotational axis independent of the pair of first links when the seat base transitions to the reclined position; and a seat pan operably coupled to the linkage assembly and positioned between the seat base frame and the seat cushion assembly, the seat pan including:

at least one hooked tab disposed on an underside of the seat pan; and a rearward support defining an arcuate portion, wherein the at least one hooked tab of the seat pan includes a first hooked tab spaced apart from a second hooked tab, and wherein the first hooked tab and the second hooked tab assist the linkage assembly in rotating about the first rotational axis and the second rotational axis.

2. The vehicle seating assembly of claim 1, wherein the reclined position includes rotating the seatback in a vehicle-rearward direction and raising the seat base from the seated position such that an angle between the seat base and the seatback increases.

3. The vehicle seating assembly of claim 1, wherein the first hooked tab and the second hooked tab of the seat pan are rotatably coupled to the first cross beam, and wherein the pair of first links allow the first and second hooked tabs of the seat pan to rotate about the first cross beam to adjust the seat base to a first angle.

4. The vehicle seating assembly of claim 1, wherein the second link allows the first and second hooked tabs of the seat pan to rotate about the first cross beam to adjust the seat base to a second angle.

5. The vehicle seating assembly of claim 3, wherein the reclined position includes increasing a first distance between an underside of the forward portion of the seat base and the vehicle floor when the pair of first links adjust the seat base to the first angle.

6. The vehicle seating assembly of claim 5, wherein the reclined position includes increasing a second distance between the underside of the forward portion of the seat base and the vehicle floor when the second link adjusts the seat base to the second angle.

7. The vehicle seating assembly of claim 6, wherein the pair of first links rotate about the first rotational axis to the first distance and the second link rotates about the second rotational axis to the second distance.

8. The vehicle seating assembly of claim 7, wherein the arcuate portion of the rearward support rotates about the second cross beam when the seat base travels the first distance and the second distance.

9. The vehicle seating assembly of claim 1, wherein the reclined position includes decreasing a third distance between the seatback and the vehicle floor.

10. The vehicle seating assembly of claim 1, wherein the first cross beam includes a first end coupled to a support bracket proximate one of the pair of first links and a second end coupled to the second link.

11. The vehicle seating assembly of claim 1, wherein the second cross beam is operably coupled to a rotation assembly coupled to the seat base frame, wherein the rotation assembly is configured to adjust the rearward portion of the seat base.

12. A vehicle seating assembly, comprising:

a seat base frame including a first cross beam and a second cross beam;

a seat base operable between a seated position and a reclined position;

a seat pan operably coupled to the seat base, wherein the seat pan includes a first hooked tab spaced apart from a second hooked tab; and a linkage assembly including a pair of first links each having a first end and a second end, wherein the first end of one of the pair of first links is coupled to the second end of the other of the pair of first links to adjust the seat base from the seated position to the reclined position, wherein the first cross beam includes a first end coupled to a support bracket proximate one of the pair of first links and a second end coupled to a second link.

13. The vehicle seating assembly of claim 12, further comprising:

an actuator assembly coupled to the seat base frame, wherein the actuator assembly is configured to adjust the linkage assembly to rotate the seat base about the first cross beam via the first hooked tab and the second hooked tab of the seat pan to adjust the seat base to the reclined position.

14. The vehicle seating assembly of claim 12, wherein the seat pan includes a rearward support defining an arcuate portion, and wherein the arcuate portion of the rearward support rotatably engages the second cross beam to rotate about the second cross beam when the seat base transitions to the reclined position.

15. A vehicle seating assembly, comprising:

a seat base frame including a first cross beam configured to be positioned in a vehicle-forward location and a second cross beam configured to be positioned in a vehicle-rearward location;

a seat base operable between a seated position and a reclined position;

a seat pan operably coupled to the seat base, wherein the seat pan includes a hooked tab and a rearward support defining an arcuate portion that forms an engagement channel; and a linkage assembly including a first pair of links, wherein one of the first pair of links adjusts the seat base a first distance and the other of the first pair of links adjusts the seat base by a second distance, and wherein the first cross beam includes a first end coupled to a support bracket proximate one of the pair of first links and a second end coupled to a second link.

16. The vehicle seating assembly of claim 15, wherein the hooked tab of the seat pan rotatably engage with the first cross beam and the engagement channel of the seat pan is rotatably engaged with the second cross beam.

17. The vehicle seating assembly of claim 15, wherein the first distance positions the seat base at a first angle and the second distance positions the seat base at a second angle, and wherein the second angle is larger than the first angle.

* * * * *